(12) United States Patent
Tsuboi et al.

(10) Patent No.: US 9,220,095 B2
(45) Date of Patent: Dec. 22, 2015

(54) COMMUNICATION SYSTEM, MOBILE STATION DEVICE, BASE STATION DEVICE, RANDOM ACCESS PROCESSING METHOD, AND INTEGRATED CIRCUIT

(75) Inventors: Hidekazu Tsuboi, Osaka (JP); Katsunari Uemura, Osaka (JP); Yasuyuki Kato, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 155 days.

(21) Appl. No.: 14/112,325

(22) PCT Filed: Apr. 9, 2012

(86) PCT No.: PCT/JP2012/059640
§ 371 (c)(1),
(2), (4) Date: Oct. 17, 2013

(87) PCT Pub. No.: WO2012/144362
PCT Pub. Date: Oct. 26, 2012

(65) Prior Publication Data
US 2014/0029595 A1    Jan. 30, 2014

(30) Foreign Application Priority Data
Apr. 20, 2011 (JP) .................................. 2011-093776

(51) Int. Cl.
*H04W 72/04* (2009.01)
*H04W 74/08* (2009.01)
*H04W 74/00* (2009.01)

(52) U.S. Cl.
CPC ........ *H04W 72/042* (2013.01); *H04W 74/0833* (2013.01); *H04W 74/002* (2013.01); *H04W 74/008* (2013.01)

(58) Field of Classification Search
None
See application file for complete search history.

(56) References Cited

U.S. PATENT DOCUMENTS

| 6,584,325 | B1 * | 6/2003 | Shakhgildian | 455/525 |
| 2008/0267161 | A1 * | 10/2008 | Bertrand et al. | 370/347 |
| 2009/0215450 | A1 * | 8/2009 | Baldemaier et al. | 455/434 |
| 2010/0296467 | A1 | 11/2010 | Pelletier et al. | |
| 2011/0249635 | A1 * | 10/2011 | Chen et al. | 370/329 |

(Continued)

FOREIGN PATENT DOCUMENTS

WO    2010/094325 A1    8/2010

OTHER PUBLICATIONS

3GPP TSG-RAN WG2 Meeting #70, "PDCCH Order and RA Selection", May 10-14, 2010, pp. 1-3.

(Continued)

*Primary Examiner* — Jenee Williams
(74) *Attorney, Agent, or Firm* — Keating & Bennett, LLP

(57) ABSTRACT

A base station device uses a downlink control channel and instructs a mobile station device to perform a random access procedure. The mobile station device switches, according to whether or not random access parameters are included in parameters of a secondary cell that has been allocated to the mobile station device, between a first random access procedure in which information in a carrier indicator field included in the downlink control channel is not used for selection of a cell in which a random access procedure is performed, and a second random access procedure in which information in the carrier indicator field included in the downlink control channel is used for selection of a cell in which a random access procedure is performed.

2 Claims, 9 Drawing Sheets

(56) References Cited

U.S. PATENT DOCUMENTS

2012/0270540 A1* 10/2012 Ode et al. .................. 455/426.1
2014/0293915 A1* 10/2014 Pelletier et al. ............... 370/329

OTHER PUBLICATIONS

3GPP TSG-RAN2#73-bis meeting, "Enhancements on MAC Procedures to Support CA with Multiple TA", Apr. 11-15, 2011, pp. 1-5.
Official Communication issued in International Patent Application No. PCT/JP2012/059640, mailed on Jun. 26, 2012.
3GPP TS 36.300 V10.3.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", Mar. 2011, 197 pages.
3GPP TS 36.321 V10.1.0, "3rd Generation Partnership Project; Technical Specification Group Radio Access Network; Evolved Universal Terrestrial Radio Access (E-UTRA); Medium Access Control (MAC) protocol specification (Release 10)", Mar. 2011; 53 pages.
3GPP TSG RAN WG2 Meeting #68bis, "Multiple Timing Advance Impact on RAN2", Huawei, 7.1.1, Jan. 18-22, 2010, 5 pages.
3GPP TSG-RAN2#69, "CA support for multi-TA", E-mail rapporteur (NTT DOCOMO, INC.), 7.1.1, Feb. 22-26, 2010, 12 pages.

* cited by examiner

COMMUNICATION SYSTEM, MOBILE STATION DEVICE, BASE STATION DEVICE, RANDOM ACCESS PROCESSING METHOD, AND INTEGRATED CIRCUIT

TECHNICAL FIELD

The present invention relates to a communication system, a mobile station device, a base station device, a random access processing method, and an integrated circuit, and particularly relates to a random access processing method used in a configuration in which a mobile station device is wirelessly connected to a base station device using a plurality of cells.

BACKGROUND ART

In the 3GPP (3rd Generation Partnership Project), which is a standardization project, Evolved Universal Terrestrial Radio Access (hereinafter also referred to as "EUTRA") has been studied, in which the OFDM (Orthogonal Frequency-Division Multiplexing) communication scheme and flexible scheduling on the basis of a predetermined combination of a frequency and time called a resource block are adopted to achieve high-speed communications. Furthermore, the study of Advanced EUTRA (also referred to as "LTE-Advanced"), which is an advanced version of EUTRA, is underway.

In Advanced EUTRA, a technique called carrier aggregation that enables higher-speed data transmission while maintaining compatibility with EUTRA has been proposed. Carrier aggregation is a technique in which data of a transmitter device transmitted using a plurality of different frequency bands (also referred to as "carrier frequencies" or "component carriers") is received by a receiver device handling the different frequency bands respectively to thereby increase a data rate. In the description below, a receiver device and a transmitter device in downlink transmission are referred to as a "mobile station device" and a "base station device" respectively, and a receiver device and a transmitter device in uplink transmission are referred to as a "base station device" and a "mobile station device" respectively; however, the scope of application of the present invention is not limited to these devices.

Component carriers used in carrier aggregation in Advanced EUTRA are classified into a Primary Component Carrier (PCC) and a Secondary Component Carrier (SCC). A cell to which a mobile station device is connected using a PCC in downlink is called a "Primary Cell (PCell)" while a cell to which a mobile station device is connected using an SCC in downlink is called a "Secondary Cell (SCell)". An uplink component carrier is always included in the primary cell but is not included in some secondary cells.

A mobile station device based on EUTRA performs processing for transmission timing adjustment for uplink (synchronization of uplink) called a "random access procedure" when initial connection to a base station device is attempted, when handover is performed, or when uplink data transmission or downlink data reception needs to be performed in the state where uplink is out of synchronization. It is specified in the current Advanced EUTRA that the random access procedure is performed only in the primary cell (see NPL 1).

The third generation base station device specified by 3GPP is called a "NodeB" and the base station device in EUTRA and Advanced EUTRA is called an "eNodeB". A base station device controls a cell, which is an area in which a mobile station device can perform communication. The cell is also called a "femto cell", a "pico cell", or a "nano cell" in accordance with the size of the area in which a mobile station device can perform communication. In the case where a mobile station device can communicate with a certain base station device, the cell of the base station device is called a serving cell of the mobile station device, while a cell of another base station device or of a different frequency is called a neighboring cell.

CITATION LIST

Non Patent Literature

NPL 1: TS36.321v10.1.0 5.1.1 (http://www.3gpp.org/ftp/Specs/html-info/36321.htm)
NPL 2: TS36.300v10.3.0 10.1.5 (http://www.3gpp.org/ftp/Specs/html-info/36300.htm)

SUMMARY OF INVENTION

Technical Problem

As described above, in the current Advanced EUTRA, the random access procedure is performed in a primary cell only. In the future, it is assumed that a case may occur where transmission and reception to/from the primary cell and transmission and reception to/from some secondary cells are required to be performed at different timings. In such a case, synchronization of uplink in a secondary cell cannot be established only with the random access procedure performed in the primary cell.

In view of the problem described above, it is an object of the present invention to provide a communication system, a mobile station device, a base station device, a random access processing method, and an integrated circuit in which the random access procedure can be efficiently performed in cells having different timings.

Solution to Problem

According to an embodiment of the present invention, a communication system in which a base station device and a mobile station device communicate with each other by aggregating a plurality of cells having different frequency bands is provided. The base station device uses a downlink control channel and instructs the mobile station device to perform a random access procedure. The mobile station device switches, according to whether or not random access parameters are included in parameters of a secondary cell that has been allocated to the mobile station device, between a first random access procedure in which information in a carrier indicator field included in the downlink control channel is not used for selection of a cell in which a random access procedure is performed, and a second random access procedure in which information in the carrier indicator field included in the downlink control channel is used for selection of a cell in which a random access procedure is performed.

It is preferable that the first random access procedure is selected in the case where random access parameters are not included in parameters of a secondary cell that has been allocated to the mobile station device, and in which a random access preamble is transmitted always on a component carrier of a primary cell, and the second random access procedure is selected in the case where random access parameters are included in parameters of a secondary cell that has been allocated to the mobile station device, and in which the information communicated in the carrier indicator field is regarded as information on an identifier of a component carrier. It is preferable that the mobile station device transmits, in the case where the identifier of a component carrier indicates a component carrier that has been allocated to the mobile station device and the component carrier is in an activated state, a random access preamble on the component carrier, and aborts, in the case where the identifier of a component carrier does not indicate a component carrier that has been allocated to the mobile station device or in the case where the component carrier is in a deactivated state, the random access procedure.

Alternatively, it is preferable that the first random access procedure is selected in the case where random access parameters are not included in parameters of a secondary cell that has been allocated to the mobile station device, and in which a random access preamble is transmitted always on a component carrier of a primary cell, and the second random access procedure is selected in the case where random access parameters are included in parameters of a secondary cell that has been allocated to the mobile station device, and in which the information communicated in the carrier indicator field is regarded as information on an identifier of a component carrier. It is preferable that the mobile station device transmits, in the case where the identifier of a component carrier indicates a component carrier that has been allocated to the mobile station device and the component carrier is in an activated state, a random access preamble on the component carrier, and transmits, in the case where the identifier of a component carrier does not indicate a component carrier that has been allocated to the mobile station device or in the case where the component carrier is in a deactivated state, a random access preamble on a component carrier of a primary cell.

According to another embodiment of the present invention, a mobile station device to which a plurality of cells are allocated by a base station device, the mobile station device communicating with the base station device via the plurality of cells, is provided. The mobile station device includes a random access processing unit that switches before performing, according to whether or not random access parameters are included in parameters of a secondary cell that has been allocated to the mobile station device, between a first random access procedure in which information in a carrier indicator field included in a downlink control channel is not used for selection of a cell in which a random access procedure is performed, and a second random access procedure in which information in the carrier indicator field included in the downlink control channel is used for selection of a cell in which a random access procedure is performed.

It is preferable that the first random access procedure is selected in the case where random access parameters are not included in parameters of a secondary cell that has been allocated to the mobile station device, and in which a random access preamble is transmitted always on a component carrier of a primary cell, and the second random access procedure is selected in the case where random access parameters are included in parameters of a secondary cell that has been allocated to the mobile station device, and in which the information communicated in the carrier indicator field is regarded as information on an identifier of a component carrier. It is preferable that the mobile station device transmits, in the case where the identifier of a component carrier indicates a component carrier that has been allocated to the mobile station device and the component carrier is in an activated state, a random access preamble on the component carrier, and aborts, in the case where the identifier of a component carrier does not indicate a component carrier that has been allocated to the mobile station device or in the case where the component carrier is in a deactivated state, the random access procedure.

Alternatively, it is preferable that the first random access procedure is selected in the case where random access parameters are not included in parameters of a secondary cell that has been allocated to the mobile station device, and in which a random access preamble is transmitted always on a component carrier of a primary cell, and the second random access procedure is selected in the case where random access parameters are included in parameters of a secondary cell that has been allocated to the mobile station device, and in which the information communicated in the carrier indicator field is regarded as information on an identifier of a component carrier. It is preferable that the mobile station device transmits, in the case where the identifier of a component carrier indicates a component carrier that has been allocated to the mobile station device and the component carrier is in an activated state, a random access preamble on the component carrier, and transmits, in the case where the identifier of a component carrier does not indicate a component carrier that has been allocated to the mobile station device or in the case where the component carrier is in a deactivated state, a random access preamble on a component carrier of a primary cell.

According to another embodiment of the present invention, a base station device that allocates a plurality of cells to a mobile station device, the base station device communicating with the mobile station device via the plurality of cells, is provided. In the case where the base station device uses a downlink control channel and instructs the mobile station device to perform a random access procedure, the base station device sets, only in the case where random access parameters are included in parameters of a secondary cell that the base station device has allocated to the mobile station device, an identifier of a component carrier, on which a random access preamble is transmitted, in a carrier indicator field included in the downlink control channel.

According to another embodiment of the present invention, a random access processing method of a mobile station device to which a plurality of cells are allocated by a base station device, the mobile station device communicating with the base station device via the plurality of cells, is provided. The random access processing method includes the step of switching before performing, according to whether or not random access parameters are included in parameters of a secondary cell that has been allocated to the mobile station device, between a first random access procedure in which information in a carrier indicator field included in a downlink control channel is not used for selection of a cell in which a random access procedure is performed, and a second random access procedure in which information in the carrier indicator field included in the downlink control channel is used for selection of a cell in which a random access procedure is performed.

It is preferable that the first random access procedure is selected in the case where random access parameters are not included in parameters of a secondary cell that has been allocated to the mobile station device, and in which a random access preamble is transmitted always on a component carrier of a primary cell, and the second random access procedure is selected in the case where random access parameters are included in parameters of a secondary cell that has been allocated to the mobile station device, and in which the information communicated in the carrier indicator field is regarded as information on an identifier of a component carrier. It is preferable that the random access processing method further includes the steps of transmitting, in the case where the identifier of a component carrier indicates a component carrier that has been allocated to the mobile station device and the component carrier is in an activated state, a random access preamble on the component carrier, and aborting, in the case where the identifier of a component carrier does not indicate a component carrier that has been allocated to the mobile station device or in the case where the component carrier is in a deactivated state, the random access procedure.

Alternatively, it is preferable that the first random access procedure is selected in the case where random access parameters are not included in parameters of a secondary cell that has been allocated to the mobile station device, and in which a random access preamble is transmitted always on a component carrier of a primary cell, and the second random access procedure is selected in the case where random access parameters are included in parameters of a secondary cell that has been allocated to the mobile station device, and in which the information communicated in the carrier indicator field is regarded as information on an identifier of a component carrier. It is preferable that the random access processing method further includes the steps of transmitting, in the case where the identifier of a component carrier indicates a component carrier that has been allocated to the mobile station device and the component carrier is in an activated state, a random access preamble on the component carrier, and transmitting, in the case where the identifier of a component carrier does not indicate a component carrier that has been allocated to the mobile station device or in the case where the component carrier is in a deactivated state, a random access preamble on a component carrier of a primary cell.

According to another embodiment of the present invention, an integrated circuit of a mobile station device to which a plurality of cells are allocated by a base station device, the mobile station device communicating with the base station device via the plurality of cells, is provided. The integrated circuit includes the function of switching before performing, according to whether or not random access parameters are included in parameters of a secondary cell that has been allocated to the mobile station device, between a first random access procedure in which information in a carrier indicator field included in a downlink control channel is not used for selection of a cell in which a random access procedure is performed, and a second random access procedure in which information in the carrier indicator field included in the downlink control channel is used for selection of a cell in which a random access procedure is performed.

It is preferable that the first random access procedure is selected in the case where random access parameters are not included in parameters of a secondary cell that has been allocated to the mobile station device, and in which a random access preamble is transmitted always on a component carrier of a primary cell, and the second random access procedure is selected in the case where random access parameters are included in parameters of a secondary cell that has been allocated to the mobile station device, and in which the information communicated in the carrier indicator field is regarded as information on an identifier of a component carrier. It is preferable that the integrated circuit transmits, in the case where the identifier of a component carrier indicates a component carrier that has been allocated to the mobile station device and the component carrier is in an activated state, a random access preamble on the component carrier, and aborts, in the case where the identifier of a component carrier does not indicate a component carrier that has been allocated to the mobile station device or in the case where the component carrier is in a deactivated state, the random access procedure.

Alternatively, it is preferable that the first random access procedure is selected in the case where random access parameters are not included in parameters of a secondary cell that has been allocated to the mobile station device, and in which a random access preamble is transmitted always on a component carrier of a primary cell, and the second random access procedure is selected in the case where random access parameters are included in parameters of a secondary cell that has been allocated to the mobile station device, and in which the information communicated in the carrier indicator field is regarded as information on an identifier of a component carrier. It is preferable that the integrated circuit transmits, in the case where the identifier of a component carrier indicates a component carrier that has been allocated to the mobile station device and the component carrier is in an activated state, a random access preamble on the component carrier, and transmits, in the case where the identifier of a component carrier does not indicate a component carrier that has been allocated to the mobile station device or in the case where the component carrier is in a deactivated state, a random access preamble on a component carrier of a primary cell.

Advantageous Effects of Invention

According to the present invention, a communication system, a mobile station device, a base station device, a random access processing method, and an integrated circuit in which the random access procedure can be efficiently performed in cells having different timings can be provided.

DESCRIPTION OF EMBODIMENTS

Figure 1:
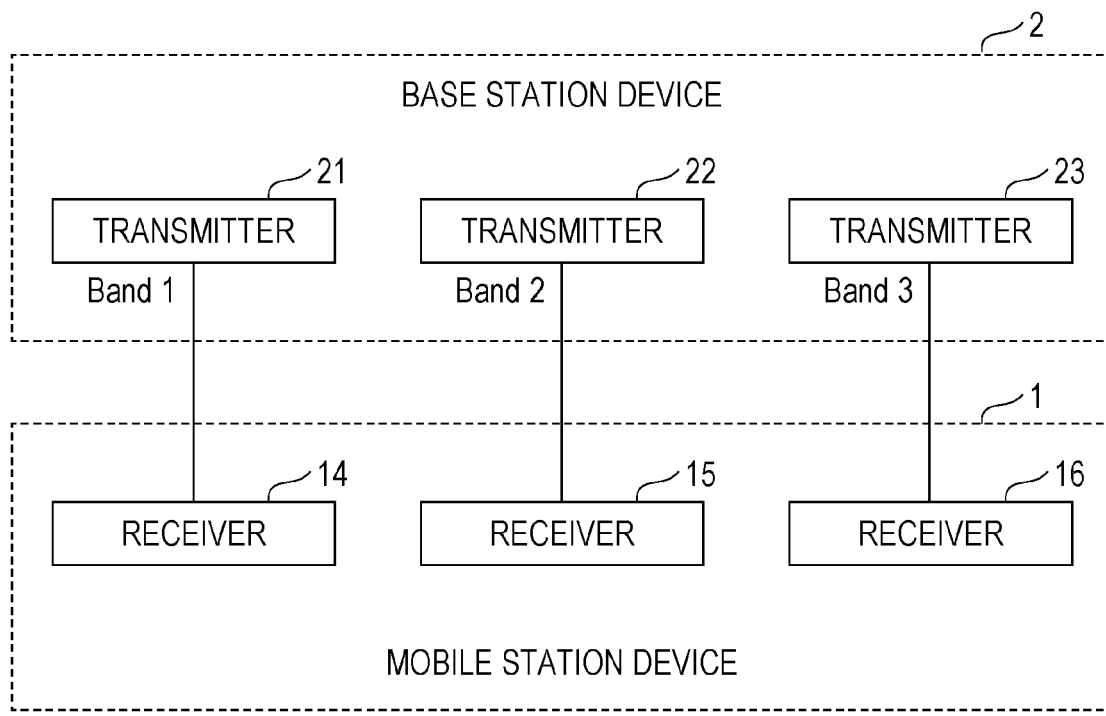
FIG. 1 is a diagram illustrating an example of a communication network configuration according to an embodiment of the present invention.

Before embodiments of the present invention are described, physical channels, carrier aggregation, and a random access procedure relating to the present invention are described.

(1) Physical Channels

Physical channels (or physical signals) used in EUTRA and Advanced EUTRA are described. Physical channels include downlink channels in downlink that are transmitted from a base station device to a mobile station device and uplink channels in uplink that are transmitted from a mobile station device to a base station device. Addition of physical channels or modification of the structures of physical channels may be made in EUTRA and Advanced EUTRA in the future; however, the description of the embodiments of the present invention will not be affected in case such changes are made.

A synchronization signal is constituted by three types of primary synchronization signals and a secondary synchronization signal constituted by 31 types of codes, which are alternately arranged in a frequency domain. With a combination of a primary synchronization signal and a secondary synchronization signal, 504 different cell identities (cell IDs: Physical Cell Identities; PCIs) for identifying base station devices and a frame timing for radio synchronization are provided. A mobile station device identifies a cell ID provided in a synchronization signal received via a cell search.

A Physical Broadcast Channel (PBCH) is transmitted for communicating control parameters (broadcast information (that is, system information)) commonly used among mobile station devices in a cell. For broadcast information not communicated in a Physical Broadcast Channel, a radio resource for broadcast information is indicated through a downlink control channel and the broadcast information is transmitted in a layer 3 message using a downlink shared channel. As broadcast information, a Cell Global Identifier (CGI) that is an identifier of each cell, a Tracking Area Identifier (TAI) for managing a waiting area by paging, and the like are communicated.

A downlink reference signal is a pilot signal transmitted to each cell with predetermined power. A downlink reference signal is a known signal that is cyclically repeated at frequency/time positions on the basis of a predetermined rule. A mobile station device receives downlink reference signals to measure the reception quality for each cell. Furthermore, a mobile station device uses downlink reference signals as signals for reference in order to demodulate downlink control channels transmitted simultaneously with the downlink reference signals, or downlink shared channels. The sequence used for downlink reference signals is a sequence with which each cell can be identified. Note that the downlink reference signal may be expressed as a "cell-specific RS (cell-specific reference signal)"; however the use and meaning thereof is the same as those of the downlink reference signal.

A downlink control channel (PDCCH: Physical Downlink Control Channel) is transmitted in the first and following OFDM symbols of each subframe and used for communicating radio resource allocation information in accordance with scheduling of a base station device, giving an instruction to increase or decrease transmission power, giving an instruction to initiate a random access procedure, and the like. A mobile station device needs to acquire radio resource allocation information, which is called an uplink grant upon transmission and a downlink grant upon reception, by observing (monitoring) downlink control channels addressed to the mobile station device and receiving downlink control channels addressed to the mobile station device before transmitting or receiving layer 3 messages (paging, a handover command, and the like), which are downlink data or downlink control data.

A downlink shared channel (PDSCH: Physical Downlink Shared Channel) is used to communicate paging or broadcast information as layer 3 messages, which are downlink control data, as well as to communicate downlink data. The radio resource allocation information on downlink data channels is provided in downlink control channels.

An uplink shared channel (PUSCH: Physical Uplink Shared Channel) is used to mainly transmit uplink data and uplink control data and may contain the reception quality of downlink or control data such as an ACK or a NACK. As in the case of downlink, the radio resource allocation information on uplink data channels is provided in downlink control channels.

A Physical Random Access Channel (PRACH) is a channel used for communicating a preamble sequence and has a guard time. A Physical Random Access Channel is used as means of a mobile station device for accessing a base station device. A mobile station device uses a Physical Random Access Channel for requesting scheduling of transmission data when an uplink control channel is not configured and/or requesting transmission timing adjustment information necessary for setting an uplink transmission timing within the reception timing window of a base station device. A mobile station device that receives transmission timing adjustment information sets a valid time period of the transmission timing adjustment information and manages the uplink state, while supposing that uplink is in a "transmission timing adjusted state" when within the valid time period and in a "transmission timing non-adjusted state" when outside of the valid time period. A base station device can allocate a dedicated preamble sequence to a mobile station device in order to have the mobile station device initiate a random access procedure. Physical channels other than those described above are not directly related to the embodiments of the present invention and therefore such physical channels are not described in detail herein.

(2) Carrier Aggregation

Carrier aggregation is a technique for aggregating a plurality of cells (component carriers) having different frequency bands and handling the plurality of different frequency bands as if they were a single frequency band. For example, in the case where five component carriers each having a frequency bandwidth of 20 MHz are aggregated using carrier aggregation, a mobile station device can assume the bandwidths are a frequency bandwidth of 100 MHz and perform access. The frequency bands of aggregated component carriers may be contiguous or all or some of the frequency bands may be non-contiguous. For example, in the case where frequency bands of 800 MHz, 2 GHz, and 3.4 GHz are available, transmission may be such that one component carrier is transmitted in the 800 MHz band, another component carrier is transmitted in the 2 GHz band, and yet another component carrier is transmitted in the 3.4 GHz band.

It is also possible to aggregate contiguous or non-contiguous component carriers in a single frequency band, for example, the 2 GHz band. The frequency bandwidth of each component carrier may be narrower than 20 MHz or the frequency bandwidths may vary among component carriers.

A base station device can increase or decrease the number of component carriers in uplink or downlink that are allocated to a mobile station device on the basis of various elements such as the amount of buffered data remained unprocessed, the reception quality relating to the mobile station device, the load in a cell, and QoS.

Specifically, a base station device can communicate to a mobile station device addition, modification of parameters, or release of a component carrier (secondary cell). For such a communication, layer 3 messages (Radio Resource Control messages; RRC messages) are typically used. For example, in the case where a base station device adds a component carrier and modifies parameters for a mobile station device, the base station device communicates to the mobile station device a secondary cell index (sCell Index) and, as parameters corresponding to the secondary cell index, a physical cell identity, carrier frequency information, parameter setting information relating to radio resources, and the like. The mobile station device that receives such a communication assumes that, in the case where a secondary cell corresponding to the communicated secondary cell index has already been configured for the mobile station device, the communication is for modification of parameters of the secondary cell, and assumes that, in the case where a secondary cell corresponding to the communicated secondary cell index is not configured, the communication is for addition of a secondary cell. In the case where a component carrier is released, a secondary cell index is communicated from a base station device to a mobile station device and the mobile station device releases secondary cell information corresponding to the communicated secondary cell index.

2-1. Example of Communication Network Configuration

FIG. 1 is a diagram illustrating an example of a communication network configuration according to an embodiment of the present invention. In the case where a mobile station device 1 can simultaneously use a plurality of frequency bands (component carriers; Bands 1 to 3) by carrier aggregation and be wirelessly connected to a base station device 2, the communication network configuration as illustrated in FIG. 1 is preferable. More specifically, a configuration, in which a certain single base station device, the base station device 2, has transmitters 21, 22, and 23 (and receivers that are not illustrated) respectively corresponding to a plurality of frequency bands and each of the frequency bands is controlled by the single base station device, the base station device 2, is preferable from the viewpoint of simplification of control. The mobile station device 1 has receivers 14, 15, and 16 that correspond to the transmitters 21 to 23 of the base station device 2 respectively. A configuration, in which the base station device 2 uses one transmitter to perform transmission in a plurality of frequency bands because the plurality of frequency bands are contiguous, for example, may be allowed. The communicable ranges attained by the frequency bands that are controlled by the transmitters of the base station device 2 are assumed to be cells and are present in the spatially same area. In this case, the areas (cells) covered by the frequency bands may have different sizes and/or different shapes.

In the description below, each area covered by a frequency of a component carrier that is formed by the base station device 2 is called a cell. It should be noted that this cell may be different from a cell as defined in a communication system that is actually operated. For example, in a certain communication system, some of the component carriers used in carrier aggregation may be defined as merely additional radio resources, not cells. In the embodiment, a case may occur in which a component carrier is called a cell, resulting in the definition of this cell different from that of a cell in a communication system actually operated. Even if this is the case, the spirit of the present invention will not be affected. Note that the mobile station device 1 may be wirelessly connected to the base station device 2 via a relay station device (or a repeater).

2-2. Setting Example of Configuration of Component Carriers

Figure 2:
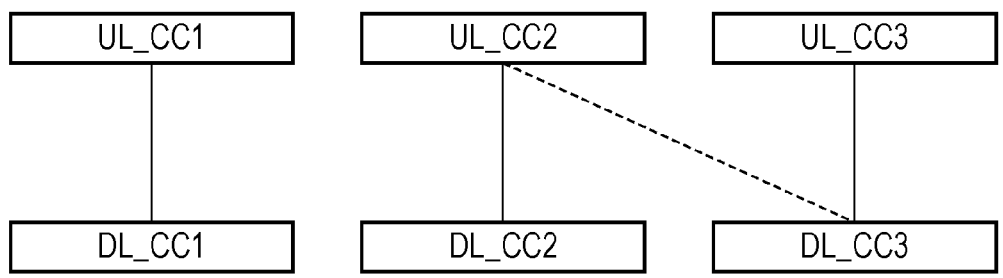
FIG. 2 is a diagram illustrating an example of a configuration of component carriers for a mobile station device according to the embodiment of the present invention.

FIG. 2 is a diagram illustrating an example of correspondences between downlink component carriers and uplink component carriers that the base station device 2 configures for the mobile station device 1 according to the embodiment of the present invention in the case where the mobile station device 1 performs carrier aggregation. In FIG. 2, a downlink component carrier DL_CC1 and an uplink component carrier UL_CC1, a downlink component carrier DL_CC2 and an uplink component carrier UL_CC2, and a downlink component carrier DL_CC3 and an uplink component carrier UL_CC3 each have a cell specific linkage. The cell specific linkage is a correspondence (coordination relationship) between a frequency band for uplink and a frequency band for downlink, with which access to the base station device 2 is possible, in the case where the mobile station device 1 does not perform carrier aggregation, for example. The correspondence is typically provided in broadcast information. The correspondence between a frequency band for uplink and a frequency band for downlink is explicitly specified in broadcast information as frequency information, or implicitly specified, when not explicitly specified, using information on a predetermined frequency difference between uplink and downlink, which is uniquely determined for each operation frequency, for example. The method of specifying the correspondence is not limited to those described above and a method other than those described above may be used for the specification as long as the correspondence between a frequency band for uplink and a frequency band for downlink can be provided for each cell.

Furthermore, the base station device 2 can set a correspondence between a downlink component carrier and an uplink component carrier specifically for each mobile station device, the mobile station device 1 (which is called a UE specific linkage) separately from the cell specific linkage. The UE specific linkage is configured at the same time when the base station device 2 adds a downlink component carrier and an uplink component carrier. In the case illustrated in FIG. 2, the two downlink component carriers (DL_CC2 and DL_CC3) correspond to the uplink component carrier UL_CC2 to which a certain mobile station device, the mobile station device 1, is wirelessly connected. The DL_CC3 has a UE specific linkage with the UL_CC2, and the DL_CC1 and DL_CC2 have cell specific linkages with the UL_CC1 and UL_CC2 respectively. In this case, the mobile station device 1 uses the DL_CC1 to DL_CC3 to perform reception processing while using the UL_CC1 and UL_CC2 to perform transmission processing. More specifically, the DL_CC1 to DL_CC3 and the UL_CC1 and UL_CC2 are connection component carriers that the mobile station device 1 uses for communication with the base station device 2 and the UL_CC3 is a non-connection component carrier that the mobile station device 1 does not use for communication with the base station device 2. Typically, uplink and downlink in a primary cell have a cell specific linkage while uplink and downlink in a secondary cell have a UE specific linkage.

For transmission power adjustment when the mobile station device 1 performs transmission on uplink component carriers, the reception quality relating to downlink component carriers (such as the path loss value that represents the amount of the power of radio signals attenuated from when the radio signals are transmitted from the base station device 2 until when the radio signals are received by the mobile station device 1) is used. For transmission power adjustment for a primary cell, the reception quality relating to downlink in the primary cell is used. Transmission power adjustment for a secondary cell is performed on the basis of either the reception quality relating to downlink in a primary cell or the reception quality relating to downlink in the secondary cell. Whether to use, for transmission power adjustment for a secondary cell, the reception quality relating to downlink in a primary cell or the reception quality relating to downlink in the secondary cell is communicated from the base station device 2 to the mobile station device 1 in broadcast information or in a layer 3 message (RRC message) specific to each mobile station device, the mobile station device 1.

In order to achieve power consumption reduction and resource usage efficiency of the mobile station device 1, Advanced EUTRA defines two states for a secondary cell that is allocated (configured) to the mobile station device 1. The transition between the two states is performed for each component carrier when an instruction for activation or deactivation is explicitly or implicitly given by the base station device 2. For downlink reception and uplink transmission, the mobile station device 1 can use an activated component carrier but cannot use a deactivated component carrier. The deactivation may be managed for a pair of downlink and uplink or for downlink and uplink independently of each other.

(3) Random Access Procedure

The random access procedure includes two types of access procedures, which are contention-based random access and non-contention-based random access.

The contention-based random access is a random access procedure in which there is a possibility of collision between mobile station devices and is used when a mobile station device initially accesses a base station device in the state where the mobile station device is not connected to (does not communicate with) the base station device and/or when a mobile station device makes a scheduling request in response to occurrence of uplink data transmission in the mobile station device in the state where the mobile station device is connected to a base station device but uplink synchronization is not adjusted.

The non-contention-based random access is a random access procedure in which collision does not occur between mobile station devices and is used to promptly establish uplink synchronization between a mobile station device and a base station device in the case where the base station device and the mobile station device are connected to each other but uplink synchronization is not adjusted. Mainly in the special case where handover is performed or where the transmission timing of a mobile station device is not valid, the mobile station device initiates such random access procedure in response to an instruction given by a base station device (see NPL 1). An instruction for the non-contention-based random access is given in a message of the RRC (Radio Resource Control: Layer 3) layer or in control data of a downlink control channel PDCCH.

Figure 3:
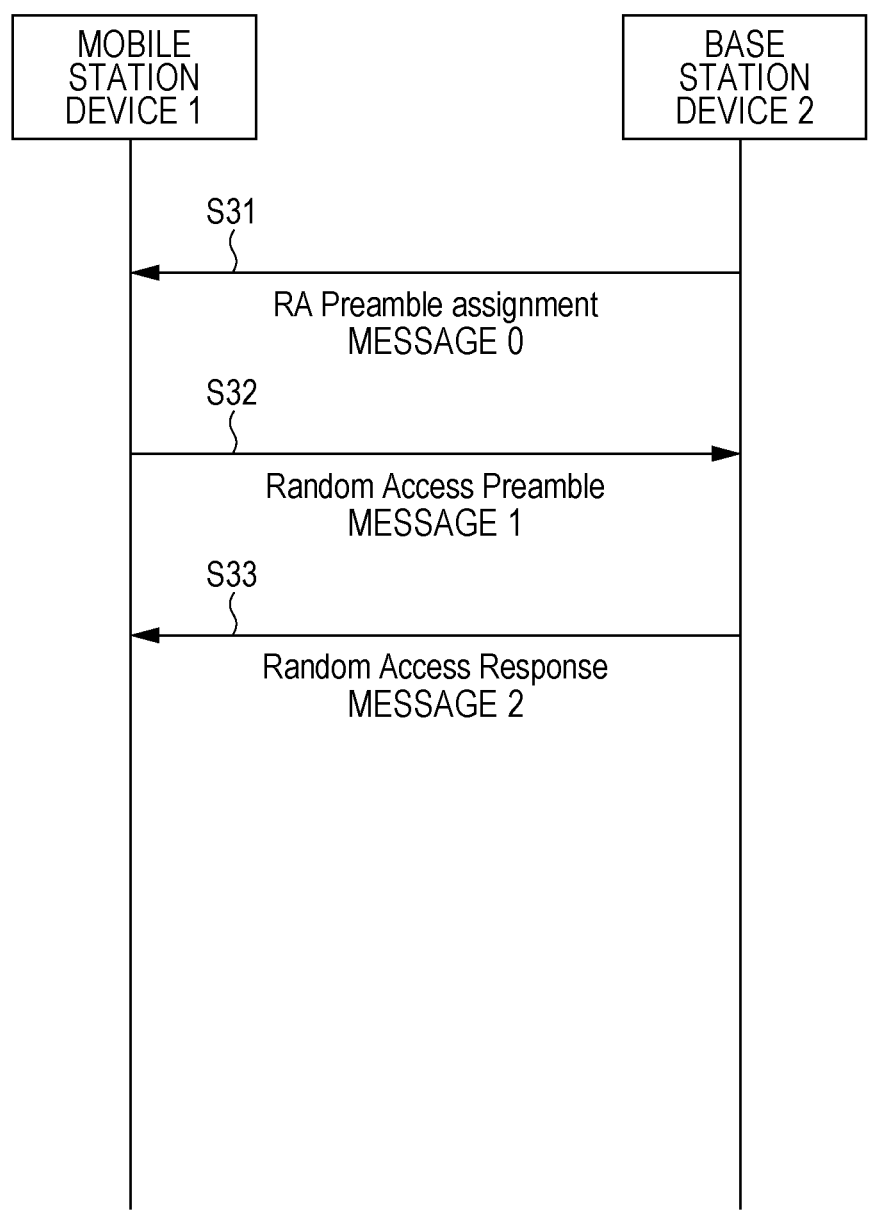
FIG. 3 is a diagram illustrating a non-contention-based random access procedure in Advanced EUTRA.

The non-contention-based random access procedure using a downlink control channel PDCCH when carrier aggregation in Advanced EUTRA is performed is described with reference to FIG. 3. First, the base station device 2 communicates to the mobile station device 1 information necessary for the random access procedure as Downlink Control Information (DCI) using a downlink control channel PDCCH of a primary cell (message 0, S31). The DCI for the random access procedure is communicated using a predetermined format (Format 1A) and includes random access preamble transmission resource allocation information (PRACH Mask Index) and a Preamble Index.

When the mobile station device 1 receives the PDCCH that includes the DCI for the mobile station device 1, the mobile station device 1 transmits a random access preamble (message 1) corresponding to the specified preamble index using an uplink resource allocated to the primary cell (S32).

When the base station device 2 detects the random access preamble from the mobile station device 1, the base station device 2 calculates from the random access preamble the amount of difference between the transmission timing of the mobile station device 1 and the transmission timing of the base station device 2. The base station device 2 transmits a random access response message (message 2), in which an RA-RNTI (random access response identity information; Random Access-Radio Network Temporary Identity) for indicating a response (random access response) to the mobile station device 1 that has transmitted the random access preamble is included in a downlink control channel PDCCH, and transmission timing adjustment information based on the amount of difference between the timings, scheduling information, and identity information of the received random access preamble are included in a downlink shared channel PDSCH (S33).

When the mobile station device 1 detects the RA-RNTI in the downlink control channel PDSCH, the mobile station device 1 checks the content of the random access response message placed in the downlink shared channel PDSCH. In the case where information of the transmitted random access preamble is included in the random access response message, the mobile station device 1 adjusts the transmission timing for uplink on the basis of the transmission timing adjustment information included in the random access response message. In the case where the mobile station device 1 receives transmission timing adjustment information and the received transmission timing adjustment information is valid, the mobile station device 1 starts the transmission timing timer thereof. When the transmission timing timer expires, the adjusted transmission timing becomes invalid. The mobile station device 1 can transmit data to the base station device 2 while the transmission timing is valid, and can transmit only a random access preamble when the transmission timing is invalid. The period during which the transmission timing adjustment information is valid is also called an "uplink synchronous state" and the period during which the transmission timing is not valid is also called an "uplink asynchronous state".

The transmission timing for uplink after completion of the random access procedure is updated in such a way that the base station device 2 measures uplink reference signals (reference signals for measurement or reference signals for demodulation) transmitted from the mobile station device 1 to calculate transmission timing adjustment information, and communicates to the mobile station device 1 the calculated transmission timing adjustment information by including the calculated transmission timing adjustment information in a transmission timing message. When the mobile station device 1 adjusts the transmission timing for uplink on the basis of the transmission timing adjustment information communicated from the base station device 2, the mobile station device 1 restarts the transmission timing timer. The base station device 2 also has the same transmission timing timer as that of the mobile station device 1 and, when the base station device 2 transmits a transmission timing message, the base station device 2 starts or restarts the transmission timing timer. In this way, the uplink synchronous state is managed between the base station device 2 and the mobile station device 1. When the transmission timing timer expires, the adjusted transmission timing becomes invalid and the mobile station device 1 stops uplink transmission except transmission of a random access preamble.

In consideration of the matters described above, preferred embodiments of the present invention are described below in detail with reference to the accompanying drawings. It should be noted that in the case where it is determined in the description below that specific description of a known function or a known configuration relating to the embodiments makes the spirit of the present invention unclear, the detailed description of such a function or a configuration is omitted.

<First Embodiment>

A first embodiment of the present invention is described below. In this embodiment, the processing method in which a secondary cell is involved in the processing of the random access procedure is illustrated.

Figure 4:
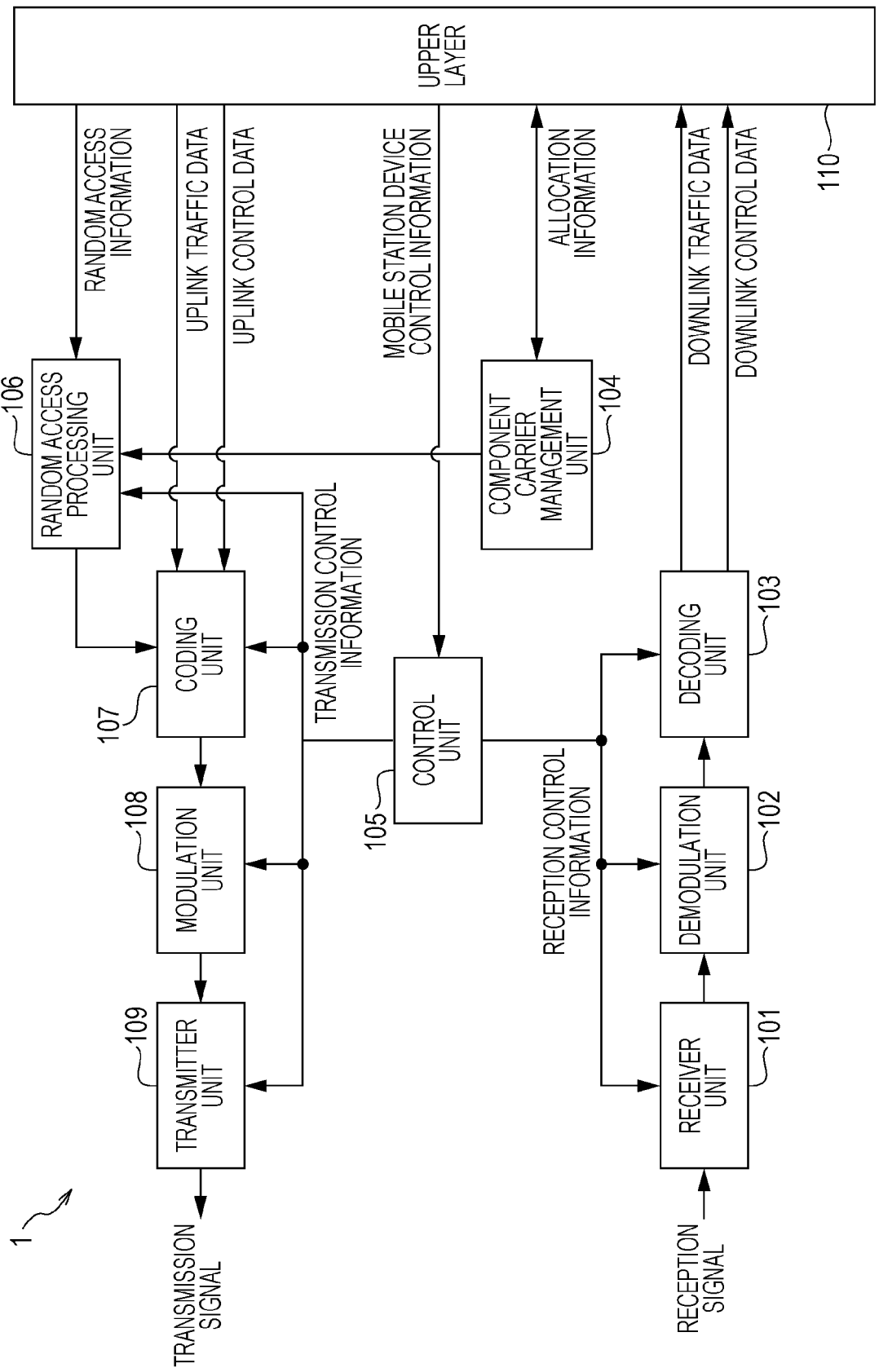
FIG. 4 is a block diagram illustrating an example of the mobile station device according to the embodiment of the present invention.

FIG. 4 is a block diagram illustrating an example of the mobile station device 1 according to the embodiment of the present invention. The mobile station device 1 includes a receiver unit 101, a demodulation unit 102, a decoding unit 103, a component carrier management unit 104, a control unit 105, a random access processing unit 106, a coding unit 107, a modulation unit 108, a transmitter unit 109, and an upper layer 110.

Before reception is started, the upper layer 110 outputs mobile station device control information to the control unit 105. The control unit 105 outputs the mobile station device control information relating to reception to the receiver unit 101, the demodulation unit 102, and the decoding unit 103 as reception control information. The reception control information includes demodulation information, decoding information, information on a reception frequency band, reception timings relating to channels, a multiplexing method, radio resource arrangement information, and the like as reception schedule information.

The receiver unit 101 receives signals from the base station device 2 via one or more receivers, which are not illustrated, in the frequency band communicated in the reception control information, converts the received signals to digital signals of a base band, and outputs the converted signals to the demodulation unit 102. The demodulation unit 102 demodulates the signals received and outputs the demodulated signals to the decoding unit 103. The decoding unit 103 correctly decodes the demodulated signals on the basis of the reception control information, appropriately separates the decoded signals into downlink traffic data and downlink control data, and outputs each piece of the data to the upper layer 110. When the downlink control data includes information on addition, modification, or release of a component carrier and/or information on activation/deactivation of an allocated component carrier, the upper layer 110 communicates to the component carrier management unit 104 such information. The component carrier management unit 104 modifies parameters of a component carrier or release a component carrier that corresponds to a secondary cell index that has already been allocated to the mobile station device 1, stores parameters of a component carrier corresponding to a new secondary cell index, and/or stores the activated/deactivated state of each secondary cell, on the basis of the communicated information. The activation/deactivation information of a component carrier may be communicated from the decoding unit 103 to the component carrier management unit 104 without passing through the upper layer 110.

Before transmission is started, the upper layer 110 outputs the mobile station device control information to the control unit 105. The control unit 105 appropriately outputs the mobile station device control information relating to transmission to the random access processing unit 106, the coding unit 107, the modulation unit 108, and the transmitter unit 109 as transmission control information. The transmission control information includes coding information, modulation information, information on a transmission frequency band, transmission timings relating to channels, a multiplexing method, radio resource arrangement information, and the like as uplink scheduling information for transmission signals.

The upper layer 110 outputs uplink traffic data and uplink control data to the coding unit 107 appropriately in accordance with uplink channels. The coding unit 107 codes each piece of the data appropriately in accordance with the transmission control information and outputs the coded data to the modulation unit 108. The modulation unit 108 modulates signals obtained by the coding performed by the coding unit 107. The modulation unit 108 multiplexes the modulated signals with downlink reference signals and maps the multiplexed signals to a frequency band.

The transmitter unit 109 converts the signals of a frequency band outputted from the modulation unit 108 to signals in a time domain, puts the converted signals on carrier waves of a predetermined frequency, performs power amplification on the converted signals, and transmits the amplified signals from one or more transmitters, which are not illustrated.

When DCI for a random access preamble transmission instruction addressed to the mobile station device 1 is included in a signal decoded by the decoding unit 103, the DCI is communicated to the random access processing unit 106 via the upper layer 110 (or directly from the decoding unit 103). The random access processing unit 106 switches the method of the random access procedure on the basis of the communicated DCI, and information on component carriers and information on activation/deactivation of the component carriers that have been obtained from the component carrier management unit 104, and initiates a random access procedure.

Uplink shared channels in which uplink control data is placed typically constitute a layer 3 message (Radio Resource Control message; RRC message). An RRC unit of the mobile station device 1 exists as part of the upper layer 110. The random access processing unit 106 exists as part of MAC (Medium Access Control) that manages the data link layer of the mobile station device 1. In FIG. 4, constituent elements of the mobile station device 1 other than those described above are not illustrated because such constituent elements are not involved in this embodiment.

Figure 5:
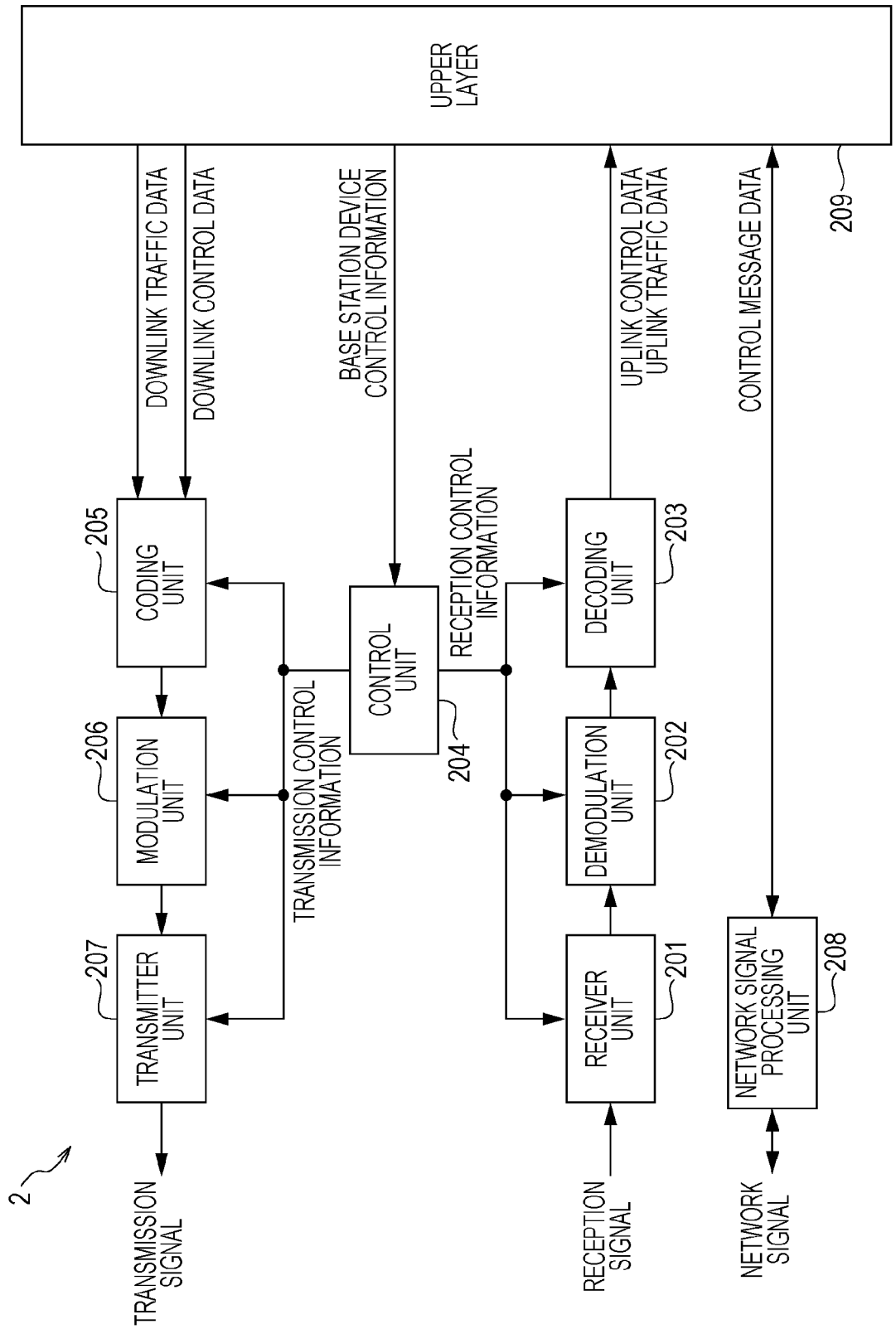
FIG. 5 is a block diagram illustrating an example of a base station device according to the embodiment of the present invention.

FIG. 5 is a block diagram illustrating an example of the base station device 2 according to the embodiment of the present invention. The base station device 2 includes a receiver unit 201, a demodulation unit 202, a decoding unit 203, a control unit 204, a coding unit 205, a modulation unit 206, a transmitter unit 207, a network signal processing unit 208, and an upper layer 209.

The upper layer 209 outputs downlink traffic data and downlink control data to the coding unit 205. The coding unit 205 codes each piece of the data that has been received and outputs the coded data to the modulation unit 206. The modulation unit 206 modulates signals obtained by the coding. The modulation unit 206 multiplexes the modulated signals with downlink reference signals and maps the multiplexed signals to a frequency band. The transmitter unit 207 converts the signals of a frequency band outputted from the modulation unit 206 to signals in a time domain, puts the converted signals on carriers of a predetermined frequency, performs power amplification on the converted signals, and transmits the amplified signals from one or more transmitters, which are not illustrated. Downlink shared channels in which downlink control data is placed typically constitute a layer 3 message (RRC (Radio Resource Control) message).

The receiver unit 201 receives signals from the mobile station device 1 described below via one or more receivers, which are not illustrated, in a frequency band communicated in reception control information, converts the received signals to digital signals of a base band, and outputs the digital signals to the demodulation unit 202. The demodulation unit 202 demodulates the digital signals and outputs the demodulated signals to the decoding unit 203. The decoding unit 203 decodes the demodulated signals, separates the decoded signals into uplink traffic data and uplink control data appropriately, and outputs each piece of the data to the upper layer 209.

The upper layer 209 outputs base station device control information necessary for controlling the blocks described above to the control unit 204. The control unit 204 outputs the base station device control information relating to transmission appropriately to each of the blocks, which are the coding unit 205, the modulation unit 206, and the transmitter unit 207, as transmission control information, and outputs the base station device control information relating to reception appropriately to each of the blocks, which are the receiver unit 201, the demodulation unit 202, and the decoding unit 203, as reception control information.

The network signal processing unit 208 transmits or receives control messages between a plurality of the base station devices 2 (or between a control station device (MME), a gateway device (gateway), or an MCE and the base station device 2). Control messages are transmitted and received via a network line. Control messages are exchanged through logical interfaces called an S1 interface, an X2 interface, an M1 interface, and an M2 interface.

An RRC unit of the base station device 2 exists as part of the upper layer 209. In FIG. 5, constituent elements of the base station device 2 other than those described above are not illustrated because such constituent elements are not involved in this embodiment.

Next, the random access processing method in the case where an instruction of a random access procedure is given to the mobile station device 1 of the embodiment using a PDCCH is described below with reference to FIG. 6.

Here, the DCI Format 1A described above includes 3-bit data called a Carrier Indicator Field (CIF), which indicates a component carrier of a PDSCH in which data addressed to the mobile station device 1 is stored.

The mobile station device 1 of the embodiment is characterized in that the mobile station device 1 switches, at an appropriate timing, between a random access procedure using the CIF, which has not been used for instruction of a random access procedure in the related art, and a random access procedure without using the CIF, according to whether or not a random access setting set by the base station device 2 is present, in order to determine a cell in which a random access procedure is initiated.

Figure 6:
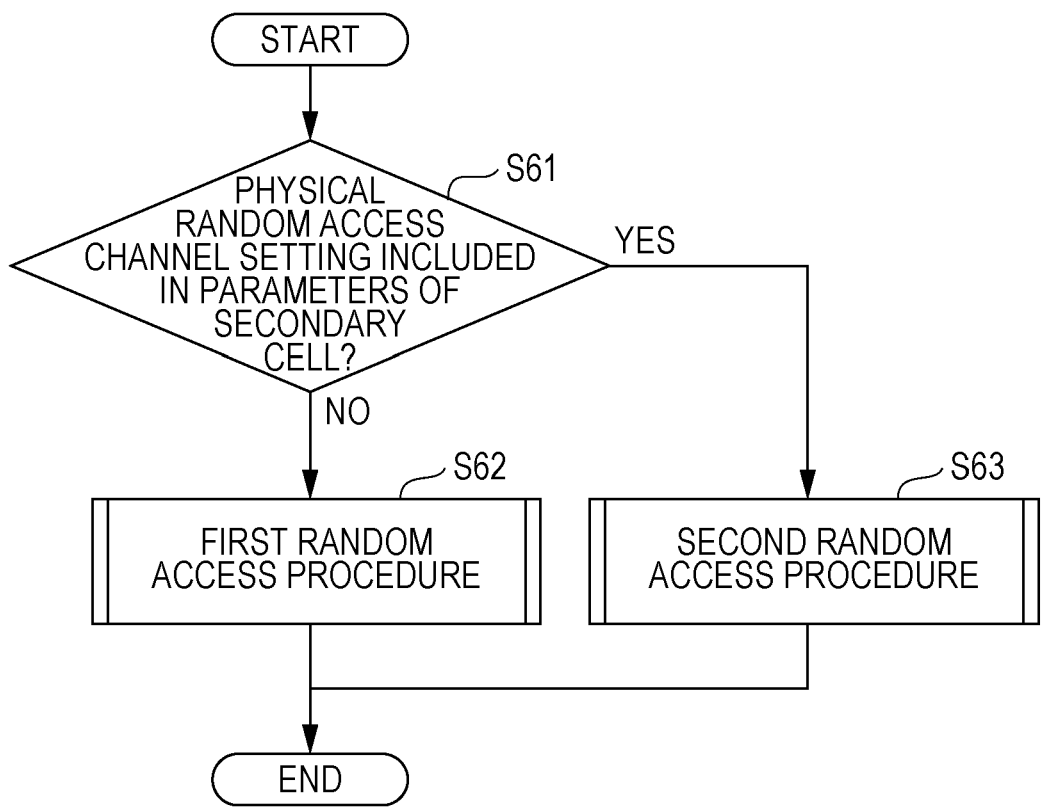
FIG. 6 is a flowchart in which the mobile station device selects a random access procedure in a first embodiment of the present invention.

FIG. 6 is a flowchart concerning selection of a random access procedure. In FIG. 6, the mobile station device 1 first determines whether or not a physical random access channel setting is included in parameters of any one of secondary cells managed by the component carrier management unit 104 (S61). If a physical random access channel setting is not included in S61, or if no secondary cell is allocated, the mobile station device 1 performs a first random access procedure (S62). The specific processes of the first random access procedure are similar to those of the known random access procedure in Advanced EUTRA and therefore the detailed description thereof is omitted. If a physical random access channel setting is included in S61, the mobile station device 1 performs a second random access procedure (S63).

Figure 7:
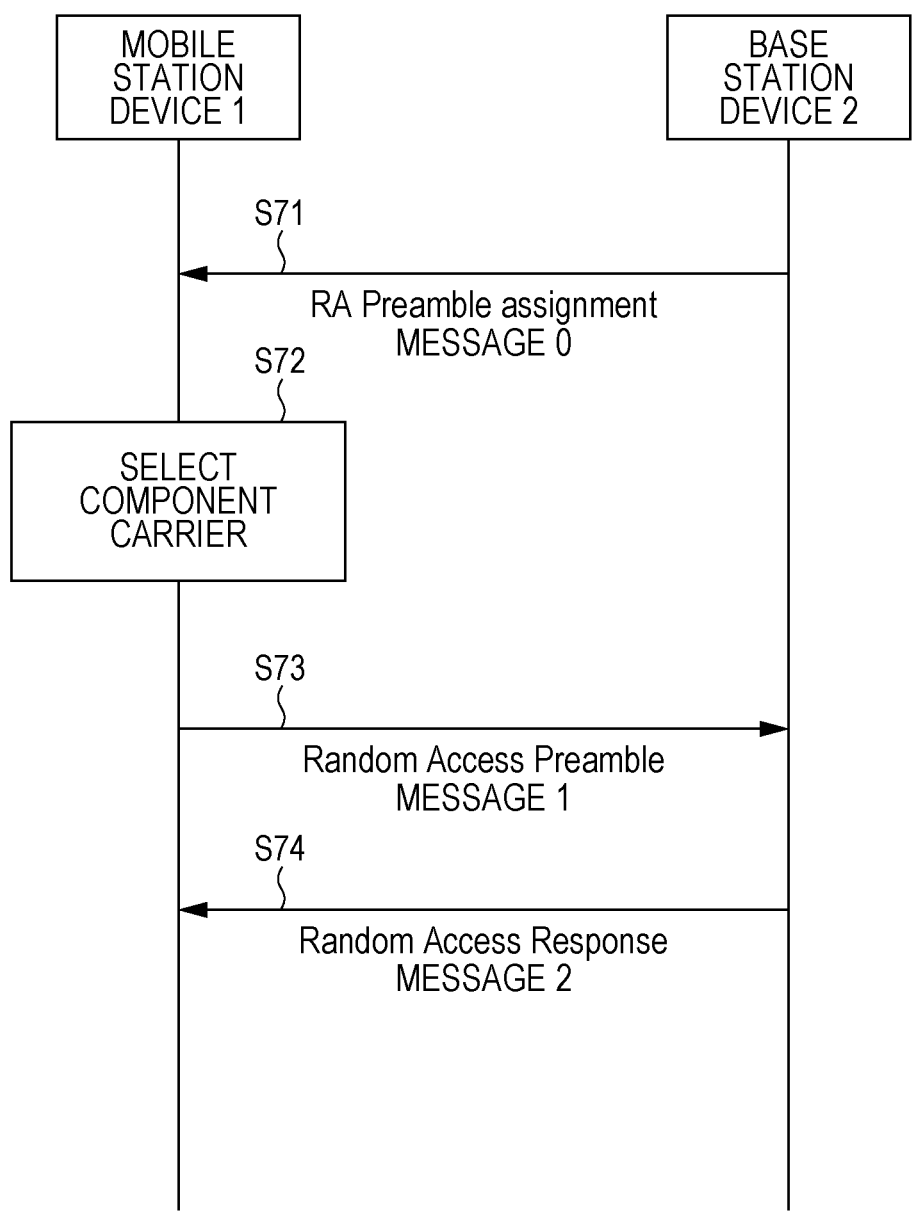
FIG. 7 is a diagram for illustrating a second random access procedure in the first embodiment of the present invention.

The second random access procedure is described below with reference to FIG. 7. In FIG. 7, the base station device 2 transmits a message 0 for assigning a random access preamble to the mobile station device 1 (S71). The message 0 includes allocation information of resources for transmitting a random access preamble and a preamble index. In the case where a physical random access channel setting is included in parameters of a secondary cell that the base station device 2 has communicated in advance to the mobile station device 1, the base station device 2 substitutes in advance the CIF included in the message 0 with an identifier that identifies any one of component carriers that the base station device 2 has allocated to the mobile station device 1 as a primary cell or a secondary cell. The value of this identifier is desirably the same as that of a secondary cell index, which is an identifier used for allocating or releasing a secondary cell in an RRC_Connection_Reconfiguration message transmitted from the base station device 2 to the mobile station device 1 (a primary cell is represented by an identifier "0"). However, the identifier is not limited to that described above and, in the case where performing of a random access procedure is allowed only in some of the secondary cells (in the case where a physical random access channel setting is included only for some of the secondary cells), the identifier may be an identifier that can identify such cells.

The mobile station device 1 that receives the message 0 selects a component carrier on which a random access preamble is transmitted (S72).

Figure 8:
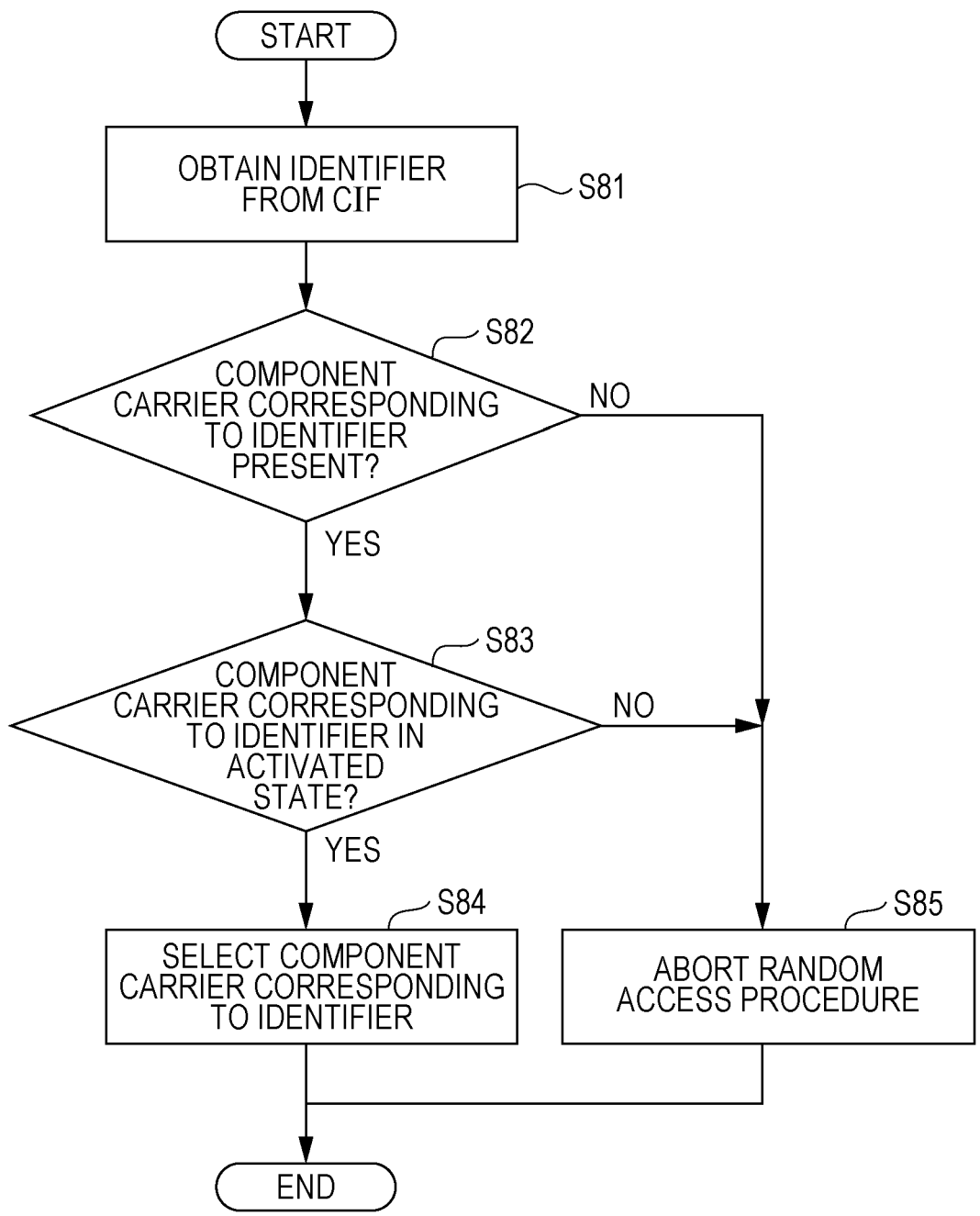
FIG. 8 is a flowchart concerning selection of a component carrier in the second random access procedure in the first embodiment of the present invention.

FIG. 8 is a flowchart concerning selection of a component carrier. In FIG. 8, the mobile station device 1 obtains the identifier of a component carrier from the CIF included in the message 0 (S81). Next, the mobile station device 1 uses component carrier allocation information obtained from the component carrier management unit 104 to determine whether or not the component carrier corresponding to the identifier obtained in S81 is present (allocated) (S82). If the component carrier corresponding to the identifier is present, the flow proceeds to S83. If the component carrier corresponding to the identifier is not present, the flow proceeds to S85. If the component carrier corresponding to the identifier is present in S82, the mobile station device 1 determines whether or not the component carrier corresponding to the identifier is in the activated state (S83). If the component carrier corresponding to the identifier is in the activated state, the flow proceeds to S84. If the component carrier corresponding to the identifier is in the deactivated state, the flow proceeds to S85. If the component carrier corresponding to the identifier is in the activated state in S83, the mobile station device 1 configures the component carrier corresponding to the identifier as a component carrier for transmitting a random access preamble and ends the flow (S84).

If the component carrier corresponding to the identifier obtained in S81 is not present in S82 or if the component carrier corresponding to the identifier is in the deactivated state in S83, the mobile station device 1 aborts the random access procedure and ends the flow (S85).

Referring back to FIG. 7, the mobile station device 1 transmits on the component carrier configured in S72 a random access preamble (message 1) based on the physical random access channel setting set for the component carrier (S73).

The base station device 2 that receives the random access preamble confirms that both the preamble index and the component carrier have been configured for the mobile station device 1 by the base station device 2. The base station device 2 transmits a random access response message (message 2), in which an RA-RNTI (Random Access-Radio Network Temporary Identity: random access response identity information) for indicating a response (random access response) addressed to the mobile station device 1 that has transmitted the random access preamble is included in a downlink control channel PDCCH while transmission timing adjustment information based on the amount of difference between the timings, scheduling information, and identity information on the received random access preamble are included in a downlink shared channel PDSCH (S74). In the random access response, at least the PDCCH may be transmitted on a downlink component carrier corresponding to the component carrier in uplink on which the mobile station device 1 has transmitted the random access preamble.

As described above, the mobile station device 1 switches between the random access procedure without using the CIF (the first random access procedure) and the random access procedure using the CIF, which has not been used for instruction of a random access procedure in the related art, (the second random access procedure) at an appropriate timing in accordance with secondary cells configured by the base station device 2 and the random access settings (physical random access channel settings) of the secondary cells to thereby appropriately determine a cell in which the random access procedure is initiated while suppressing an increase in usage of radio resources.

<Second Embodiment>

A second embodiment of the present invention is described below. In this embodiment, another example of the processing of the random access procedure using the CIF is illustrated.

The configurations of the mobile station device 1 and the base station device 2 used in this embodiment and selection of a random access procedure are similar to the configurations and the selection in the first embodiment illustrated in FIGS. 4, 5, and 6 respectively and therefore detailed description thereof is not repeated.

Figure 9:
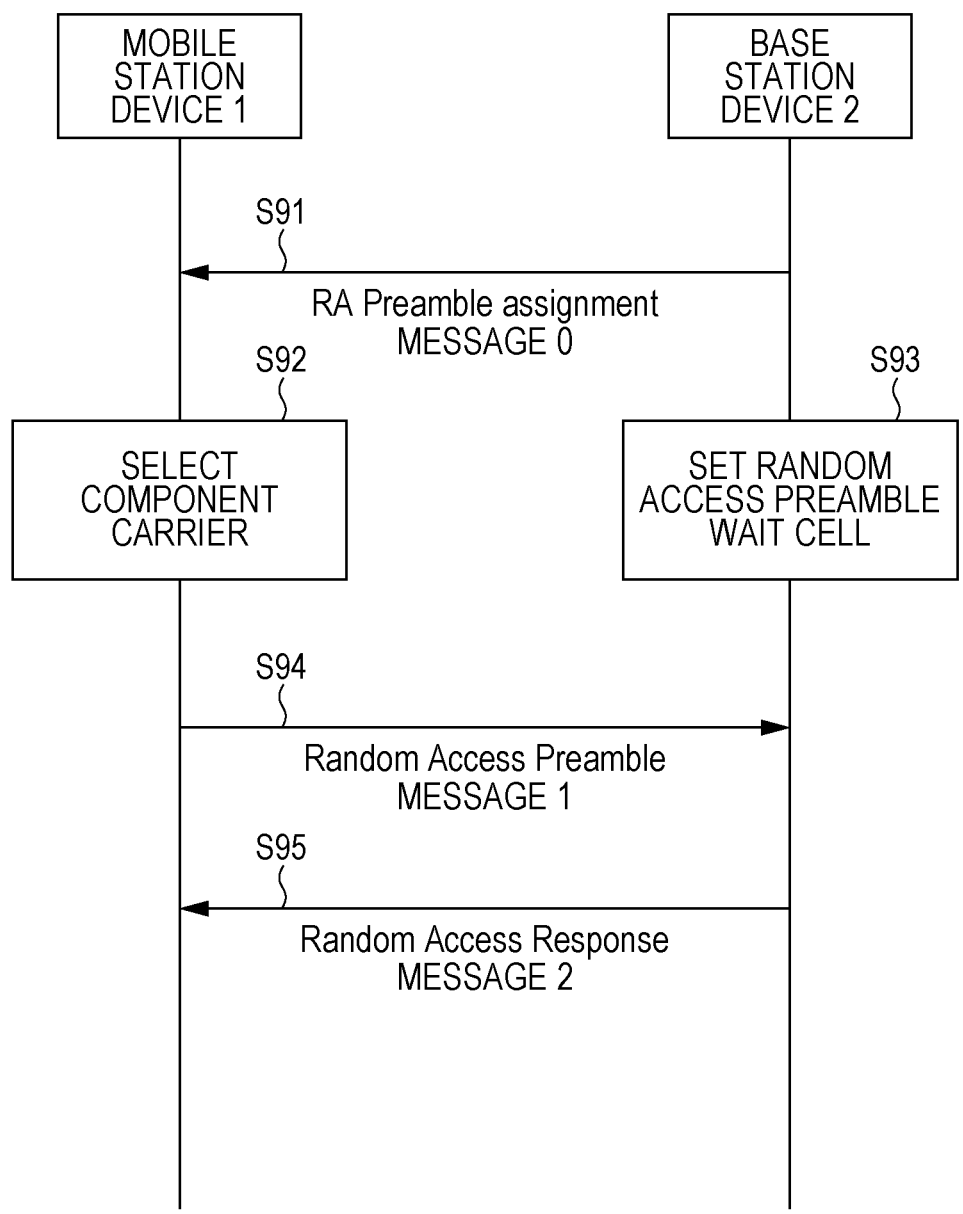
FIG. 9 is a diagram for illustrating the second random access procedure in a second embodiment of the present invention.

The second random access procedure in this embodiment is described below with reference to FIG. 9. In FIG. 9, the base station device 2 transmits a message 0 for assigning a random access preamble to the mobile station device 1 (S91). The message 0 includes allocation information of resources for transmitting a random access preamble and a preamble index. In the case where a physical random access channel setting is included in parameters of a secondary cell that the base station device 2 has communicated in advance to the mobile station device 1, the base station device 2 substitutes in advance the CIF included in the message 0 with an identifier that identifies any one of component carriers that the base station device 2 has allocated to the mobile station device 1 as a primary cell or a secondary cell. The value of this identifier is desirably the same as that of a secondary cell index, which is an identifier used for allocating or releasing a secondary cell in an RRC_Connection_Reconfiguration message transmitted from the base station device 2 to the mobile station device 1 (a primary cell is represented by an identifier "0"). However, the identifier is not limited to that described above and, in the case where performing of a random access procedure is allowed only in some of the secondary cells, the identifier may be an identifier that can identify such cells.

The mobile station device 1 that receives the message 0 selects a component carrier on which a random access preamble is transmitted (S92).

Figure 10:
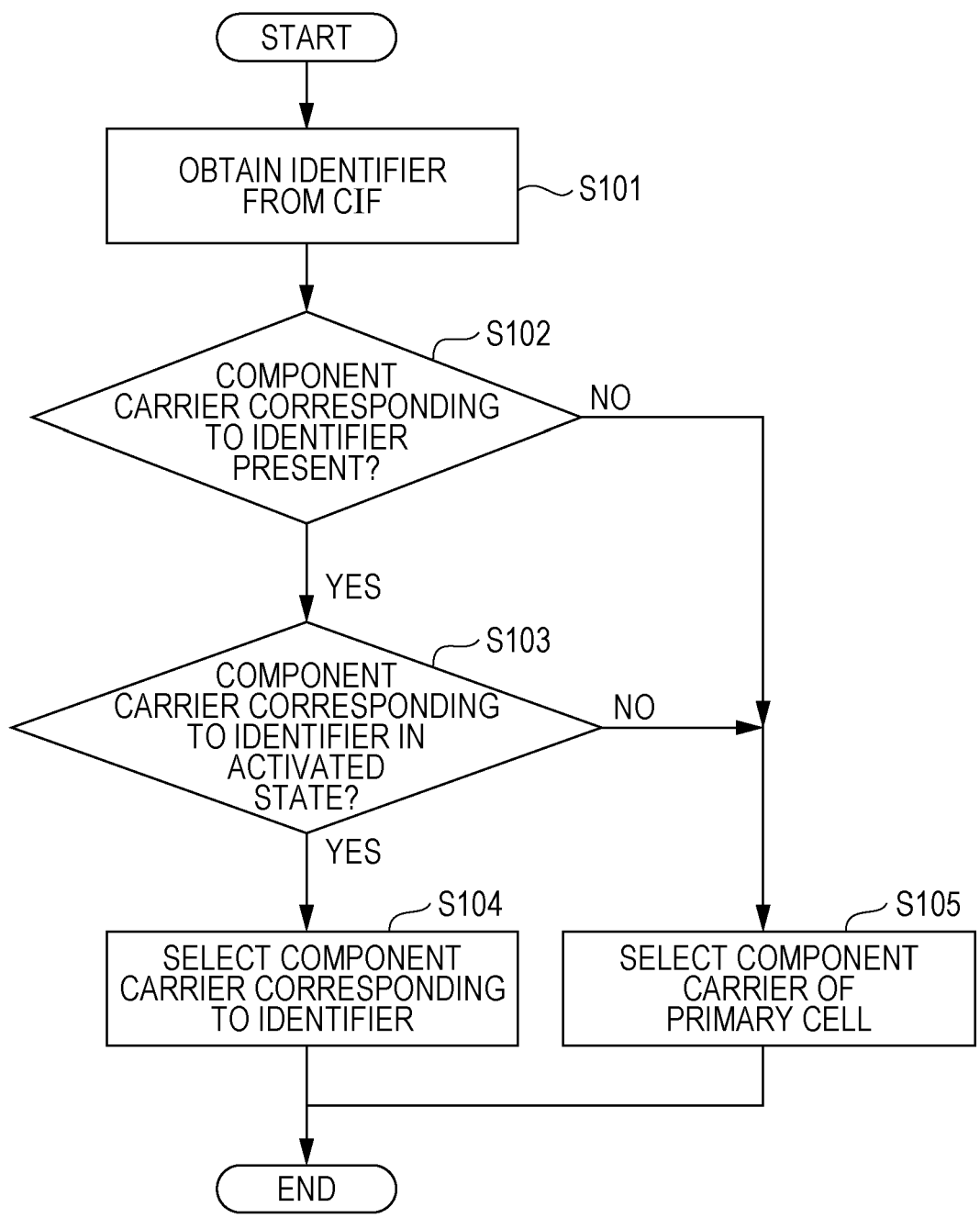
FIG. 10 is a flowchart concerning selection of a component carrier in the second random access procedure in the second embodiment of the present invention.

FIG. 10 is a flowchart concerning selection of a component carrier. In FIG. 10, the mobile station device 1 obtains the identifier of a component carrier from the CIF included in the message 0 (S101). Next, the mobile station device 1 uses component carrier allocation information obtained from the component carrier management unit 104 to determine whether or not a component carrier corresponding to the identifier obtained in S101 is present (allocated) (S102). If the component carrier corresponding to the identifier is present, the flow proceeds to S103. If the component carrier corresponding to the identifier is not present, the flow proceeds to S105. If the component carrier corresponding to the identifier is present in S102, the mobile station device 1 determines whether or not the component carrier corresponding to the identifier is in the activated state (S103). If the component carrier corresponding to the identifier is in the activated state, the flow proceeds to S104. If the component carrier corresponding to the identifier is in the deactivated state, the flow proceeds to S105. If the component carrier corresponding to the identifier is in the activated state in S103, the mobile station device 1 configures the component carrier corresponding to the identifier as a component carrier for transmitting a random access preamble and ends the flow (S104).

If the component carrier corresponding to the identifier obtained in S101 is not present in S102 or if the component carrier corresponding to the identifier is in the deactivated state in S103, the mobile station device 1 configures a primary cell as a component carrier for transmitting a random access preamble and ends the flow (S105).

Referring back to FIG. 9, the mobile station device 1 transmits on the component carrier configured in S92 a random access preamble (message 1) based on the physical random access channel setting set for the component carrier (S94).

After executing S91, the base station device 2 configures the component carrier specified in the CIF and the primary cell as component carriers for waiting for a random access preamble from the mobile station device 1 (S93).

The base station device 2 that receives the random access preamble confirms that the random access preamble is the preamble index and the component carrier (or the primary cell) that the base station device 2 has configured for the mobile station device 1. The base station device 2 transmits a random access response message (message 2), in which an RA-RNTI (Random Access-Radio Network Temporary Identity: random access response identity information) for indicating a response (random access response) addressed to the mobile station device 1 that has transmitted the random access preamble is included in a downlink control channel PDCCH while transmission timing adjustment information based on the amount of difference between the timings, scheduling information, and identity information on the received random access preamble are included in a downlink shared channel PDSCH (S95). In the random access response, at least the PDCCH may be transmitted on a downlink component carrier corresponding to the component carrier in uplink on which the mobile station device 1 has transmitted the random access preamble.

As described above, the mobile station device 1 switches between the random access procedure without using the CIF (the first random access procedure) and the random access procedure using the CIF, which has not been used for instruction of a random access procedure in the related art, (the second random access procedure) at an appropriate timing in accordance with secondary cells configured by the base station device 2 and the random access settings (physical random access channel settings) of the secondary cells to thereby appropriately determine a cell in which the random access procedure is initiated while suppressing an increase in usage of radio resources.

Furthermore, in this embodiment, in the case where a secondary cell allocated to the mobile station device 1 is in the deactivated state, transmission of a random access preamble in a primary cell is allowed and therefore delay in data transmission can be suppressed.

<Other Embodiments>

The embodiments described above are merely examples and the present invention can be implemented using various modifications and substitutions thereof.

In the embodiments described above, when selecting a random access procedure, the mobile station device 1 determines whether or not physical random access channel parameters are included in parameters of a secondary cell that has been configured for the mobile station device 1, which is a criterion for the determination. However, whether or not a random access procedure can be performed in a secondary cell may be communicated in another separate message and such information may be used as a criterion for the determination.

In the embodiments described above, when selecting a random access procedure, the mobile station device 1 determines whether or not a physical random access channel setting is included in parameters of a secondary cell that has been configured for the mobile station device 1, which is a criterion for the determination. In the case where a plurality of secondary cells have been allocated to the mobile station device 1, the second random access procedure may be selected when physical random access channel parameters are included in parameters of at least one secondary cell. Alternatively, the second random access procedure may be selected when physical random access channel parameters are included in parameters of a secondary cell that satisfies a specific condition (for example, any one of secondary cells, the timing for which is different from that of a primary cell).

For the purpose of description, the mobile station device 1 and the base station device 2 of the embodiment are described with reference to the functional block diagrams; however, the mobile station device 1 and/or the base station device 2 may be controlled by recording a program that implements the functions of the blocks of the mobile station device 1 and the base station device 2 or some of the functions in a computer readable medium and making a computer system read and execute the program recorded in the medium. It should be noted that the "computer system" described here includes an OS and hardware such as peripherals.

"Computer readable media" include portable media such as semiconductor media (for example, a RAM and a nonvolatile memory card), optical recording media (for example, a DVD, an MO, an MD, a CD, and a BD), and magnetic recording media (for example, a magnetic tape and a flexible disc), and storage devices such as a disk unit that is integrated into a computer system. Furthermore, "computer readable media" include a communication line that is used when a program is transmitted over a network such as the Internet or a communication circuit such as a telephone circuit, which dynamically retains a program in a short period of time, and a volatile memory inside a computer system that serves as a server or a client in the case of transmission of a program, which retains a program for a certain period of time. The program described above may be a program for implementing some of the functions described above. Furthermore, the program may be such that the functions can be implemented by combining the program with a program that has already been recorded in a computer system.

The functional blocks of the mobile station device 1 and the base station device 2, which are used in the embodiments described above, may be typically implemented as an LSI, which is an integrated circuit. Each of the functional blocks may be implemented as a chip or some or all of the functional blocks may be integrated into a chip. The integration of the functional blocks into a circuit is not limited to LSI and may be implemented by using a dedicated circuit or a general purpose processor. In case a new technique for integration of functional blocks into a circuit, which will replace LSI, emerges with the advancement of semiconductor technology, an integrated circuit based on such a technique may be used.

While the embodiments of the present invention have been described in detail with reference to the drawings, specific configurations are not limited to those described above, and various design modifications and so forth without departing from the spirit of the present invention are included in the scope of claims.

REFERENCE SIGNS LIST 1 mobile station device
2 base station device
14, 15, 16 receiver
21, 22, 23 transmitter
101, 201 receiver unit
102, 202 demodulation unit
103, 203 decoding unit
104 component carrier management unit
105, 204 control unit
106 random access processing unit
107, 205 coding unit
108, 206 modulation unit
109, 207 transmitter unit
110, 209 upper layer
208 network signal processing unit

The invention claimed is:

1. A mobile station device to which a plurality of cells are allocated by a base station device, the mobile station device communicating with the base station device via the plurality of cells, the mobile station device comprising:
receiving circuitry that receives parameters of a secondary cell that has been allocated to the mobile station device by the base station device, the parameters including random access parameters;
random access processing circuitry that, in a case where the mobile station device is instructed by the base station device to perform a random access procedure by using a downlink control channel;
regards indicated information in a carrier indicator field as information on an identifier of a component carrier;
initiates a random access procedure in a secondary cell, in which the indicated information in the carrier identifier field included in the downlink control channel is used, in a case where the identifier of the component carrier indicates the secondary cell that has been allocated to the mobile station device and the secondary cell is in an activated state; and
aborts, in a case where an identifier of the component carrier does not indicate a secondary cell that has been allocated to the mobile station device or in a case where the secondary cell is in a deactivated state, a random access procedure in the secondary cell.

2. A random access processing method of a mobile station device to which a plurality of cells are allocated by a base station device, the mobile station device communicating with the base station device via the plurality of cells, the method comprising:
receiving parameters of a secondary, cell that has been allocated to the mobile station device by the base station device, the parameters including random access parameters;
in a case where the mobile station device is instructed by the base station device to perform a random access procedure by using a downlink control channel, the mobile station device performs the steps of:
regarding, indicated information in a carrier indicator field as information on an identifier of a component carrier;
initiating a random access procedure in a secondary cell, in which the indicated information in the carrier identifier field included in the downlink control channel is used in a case where the identifier of the component carrier indicates the secondary cell that has been allocated to the mobile station device and the secondary cell is in an activated state; and aborting, in a case where an identifier of the component carrier does not indicate a secondary cell that has been allocated to the mobile station device or in a case where the secondary cell is in a deactivated state, a random access procedure in the secondary cell.

* * * * *